US006480886B1

(12) United States Patent
Paice

(10) Patent No.: US 6,480,886 B1
(45) Date of Patent: Nov. 12, 2002

(54) CENTRALIZED TRACE FACILITY WITH DYNAMIC TRACING IN DATA PROCESSING SYSTEM

(75) Inventor: Christopher Colin Paice, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/363,421

(22) Filed: Jul. 29, 1999

(30) Foreign Application Priority Data

Apr. 7, 1999 (GB) ............................................. 9907765

(51) Int. Cl.[7] .............................................. G06F 15/16
(52) U.S. Cl. ........................ 709/208; 709/201; 709/310; 709/332
(58) Field of Search ................................ 709/201, 100, 709/208, 310–332

(56) References Cited

U.S. PATENT DOCUMENTS

| | | | | |
|---|---|---|---|---|
| 4,321,666 A | | 3/1982 | Tasar et al. .................. 364/200 |
| 4,462,077 A | * | 7/1984 | York ........................... 714/45 |
| 4,598,364 A | | 7/1986 | Gum et al. ................... 364/300 |
| 4,809,168 A | * | 2/1989 | Hennessy et al. ........... 709/104 |
| 5,359,608 A | | 10/1994 | Belz et al. .................. 371/16.5 |
| 5,485,574 A | * | 1/1996 | Bolosky et al. ............. 709/319 |
| 5,642,478 A | | 6/1997 | Chen et al. ............. 395/183.21 |
| 5,751,956 A | * | 5/1998 | Kirsch ........................ 709/203 |
| 5,870,546 A | * | 2/1999 | Kirsch ........................ 709/205 |
| 5,915,114 A | * | 6/1999 | McKee et al. .................. 717/4 |
| 6,049,798 A | * | 4/2000 | Bishop et al. ................. 707/10 |
| 6,055,492 A | * | 4/2000 | Alexander et al. .......... 702/179 |
| 6,112,239 A | * | 8/2000 | Kenner et al. .............. 709/105 |
| 6,189,030 B1 | * | 2/2001 | Kirsch et al. ................. 705/14 |
| 6,202,199 B1 | * | 3/2001 | Wygodny et al. ........... 702/183 |

FOREIGN PATENT DOCUMENTS

| | | |
|---|---|---|
| EP | 0238364 | 9/1987 |
| GB | 2286508 | 8/1995 |

OTHER PUBLICATIONS

IBM Technical Disclosure Bulletin v37 n4B, Apr. 1994, pp369–370 "Automated Software Trace" by Yao.
IBM Technical Disclosure Bulletin n1b, Jun. 1992, pp321–322 "Lightweight Trace and Interpreter for Inter-process Timing Problems" by Cheung et al.
IBM Technical Disclosure Bulletin n7b, Dec. 1991, pp259–261 Tailorable Embedded Event Trace by Berglund et al.
IBM Research Disclosure n324 "Triggering Scheme to Trap Trace Data" by Brabec et al, Apr. 1991.
IBM Technical Disclosure Bulletin pp 5024–5026 "Dynamic Trace Mechanism for Intelligent Terminals" by Minshul et al, Mar. 1983.
IBM Technical Disclosure Bulletin n4a, Sep. 1991 pp295–297 "Distributed Trace Formatter: A program to Formal Trace Data in Any Format and Any Language" by Jordan et al.
IBM Technical Disclosure Bulletin n4a, Sep. 1991, pp292–294 "Distributed Trace: A Facility to Trace Data and Code Flows in a Requester/Server Environment" by Garrison et al.

* cited by examiner

Primary Examiner—Mark H. Rinehart
Assistant Examiner—Hai Nguyen
(74) Attorney, Agent, or Firm—Jeanine S. Ray-Yarletts

(57) ABSTRACT

In a data processing system wherein a plurality of data processing applications are in communication with each other, a first data processing apparatus running a first data processing application, the apparatus, method and computer program product has: means for receiving a message from a second data processing apparatus running a second data processing application; means for determining whether a predetermined indication is provided in the received message; and means for reporting the receipt of the received message to a central logging trace facility for logging of the message when the predetermined indication is provided in the received message.

15 Claims, 2 Drawing Sheets

CENTRALIZED TRACE FACILITY WITH DYNAMIC TRACING IN DATA PROCESSING SYSTEM

FIELD OF THE INVENTION

The present invention relates to a data processing system where a plurality of data processing applications are arranged so that they may communicate with each other. More specifically, the invention relates to trace facilities, whereby errors that occur during data processing within such a system can be identified for correction.

BACKGROUND OF THE INVENTION

Tracing routines in computer software have been provided in the prior art for the purpose of tracing through a program (also referred to herein as an "application") to assist in locating errors (also known as "bugs") therein. Tracing assists in the determination of problems by providing a snapshot record in storage of certain types of states existing when a location in a program is reached by the data processor that is running the program. A tracing routine records in storage certain events or states that take place during the running of an application. Such events or states are often stored in a trace table in memory.

It has become very common to link up (e.g., via a network (such as the Internet, for example) a plurality of data processing applications so that they may communicate with each other to thus distribute a large data processing task over several data processing applications. For example, a customer wishes to buy and sell shares over the Internet. The customer runs a Web browser application on his home personal computer, the stock broker runs a Web server application on a larger midrange computer and a transaction processing application is running on a backend mainframe computer. These three applications communicate with each other over a network (or series of connected networks) in order to exchange data messages, which can consist of requests for processing or replies containing the results of processing. In another example, the applications can be all running on the same machine, or two applications can be running on one machine and a third on a second machine.

In order to carry out tracing on such a system of linked data processing applications, one prior art technique involves each application providing its own tracing facility such that events/states occurring for each application are logged separately into a tracing table that is unique for that application. However, if something goes wrong during the running of the plurality of applications, each of the separate trace tables must be located, examined and compared with the other trace tables in order to diagnose the reason for the problem. This can be very burdensome, especially as the number of communicating applications increases.

Another prior art technique involves setting a flag at the receiving application to inform the receiving application of what kinds of incoming messages from other applications should be traced (e.g., a certain flag could mean "log all messages of type "foo" from destination application "bar"). Once a receiving application receives a message that satisfies the set flag, the receiving application communicates with a central monitoring point for centralized logging of this event (the receipt of the message that satisfies the flag). This solves the above problem by centralizing the trace table into a single location, with each application using the same trace table. However, this gives limited control over which messages should be logged (the criteria is statically set at the receiver at a given point in time), thus resulting in an over-inclusive operation whereby the centralized log stores much more information than is necessary.

SUMMARY OF THE INVENTION

According to one aspect, the present invention provides in a data processing system wherein a plurality of data processing applications are in communication with each other, a first data processing apparatus running a first data processing application, the apparatus has: a means for receiving a message from a second data processing apparatus running a second data processing application; a means for determining whether a predetermined indication is provided in the received message; and a means for reporting the receipt of the received message to a central logging trace facility for logging of the message when the predetermined indication is provided in the received message.

According to a second aspect, the present invention provides in a data processing system wherein a plurality of data processing applications are in communication with each other, a first data processing apparatus running a first data processing application, the apparatus has: a means for determining whether receipt of a message to be sent to a second data processing apparatus running a second data processing application should be logged into a central logging trace facility; a means for providing a predetermined indication in the message when the means for determining determines that the message should be logged into the central facility; and a means for sending the message to the second data processing apparatus running the second data processing application.

According to third and fourth aspects, the present invention provides methods of carrying out the functions described above with respect to the first and second aspects, respectively.

According to fifth and sixth aspects, the present invention provides computer program products stored on a computer readable storage media for, when run on a computer, carrying out the functions described above with respect to the first and second aspects.

Therefore, with the present invention, by the use of the indication (e.g., flag) carried in the data message sent to a receiving application from a sending application, the sending application can decide, on a dynamic basis, which messages should be logged by the receiving application into the centralized monitoring point. This operation is dynamic (also called "on the fly") in the sense that should the sending application make a quick decision that a particular message should be logged, even though previous communication between the applications would suggest that logging should not take place, the sending application can set a flag in the message to inform the receiving application that this message should be logged.

This provides a high level of dynamic control over exactly which messages should be logged, thus greatly reducing the amount of information contained in the log, in turn making it much quicker and easier to study the centralized log to determine what went wrong when a problem has occurred.

BRIEF DESCRIPTION OF THE DRAWINGS

The present invention will be better understood by the below detailed description of the preferred embodiments which will make reference to the following drawing figures.

DETAILED DESCRIPTION OF THE PREFERRED EMBODIMENTS

Figure 1:
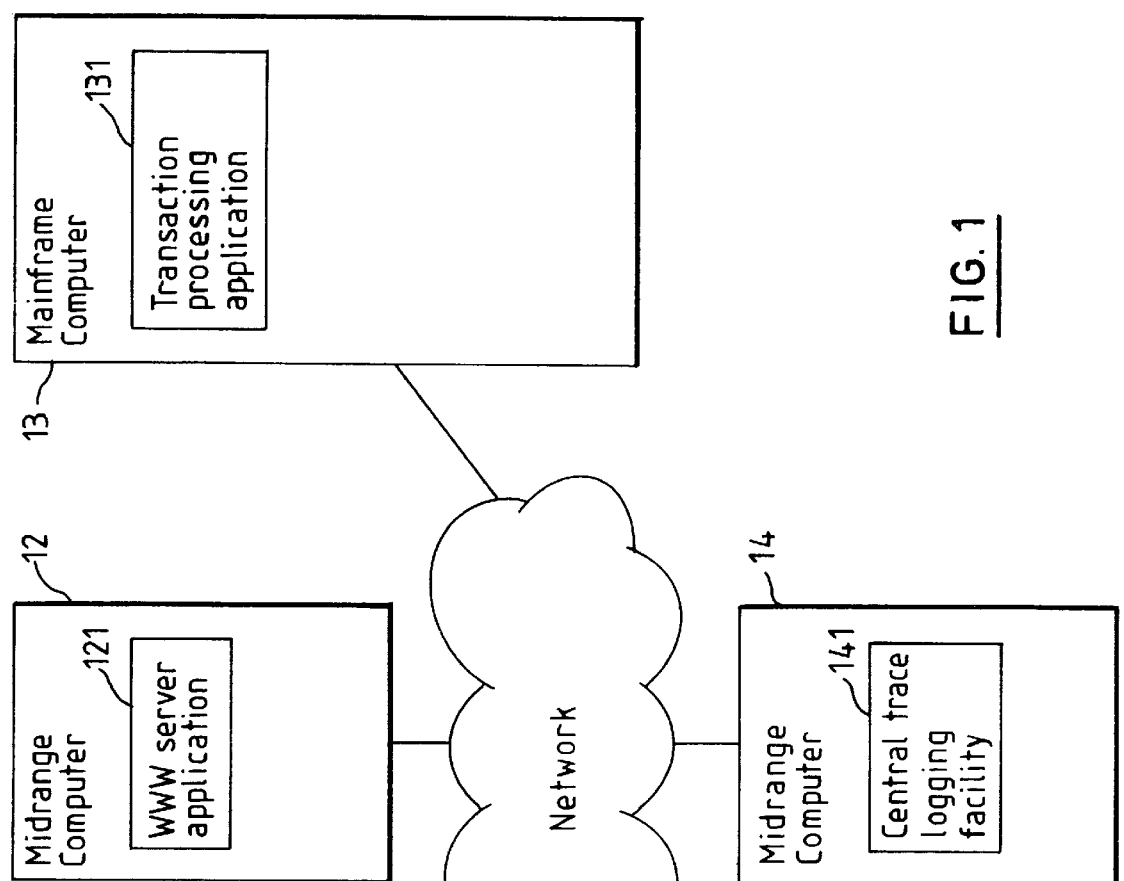
FIG. 1 is a block diagram showing a group of communicating data processing applications useful in explaining a preferred embodiment of the present invention.

FIG. 1 shows a group of four computers in communication with each other via a network 15 (which could be a collection of networks such as the Internet). Personal computer (PC) 11 is running a World Wide Web (WWW) browser application 111. Midrange computer 12 (e.g., IBM's AS/400 server machine, "AS/400" is a trademark of IBM Corp.) is running a WWW server application 121. Mainframe computer 13 is running a transaction processing application 131 (e.g., IBM's CICS program, "CICS" is a trademark of IBM Corp.). Another midrange computer 14 is running a central trace logging facility application 141.

In describing FIG. 1, we will assume that a customer using the PC 11 is buying/selling shares over the Internet 15 by first communicating with the midrange computer 12 maintained by a stockbroker. The midrange computer 12 in turn communicates with a backend mainframe computer 13, maintained at the particular stock exchange where the stocks are being traded. Using the WWW browser application 111 the customer specifies which shares he would like to buy/sell and sends the request over the network 15 to the WWW server application 121 on his stockbroker's midrange computer 12. The WWW server application 121 then relays the request over the network 15 on to the transaction processing application 131 running in mainframe computer 13, for the purpose of processing this particular transaction (e.g., updating a database storing stock information and preventing conflicting access to the database by multiple customers). Once the transaction processing application 131 has completed, the result (e.g., an indication that the database has been successfully updated) is returned to the WWW server application 121 via network 15 where the stockbroker's records can be updated (e.g., for billing the customer). Finally, the result is returned to the WWW browser application 111 to confirm to the customer that the buy/sell request has been carried out.

Figure 2:
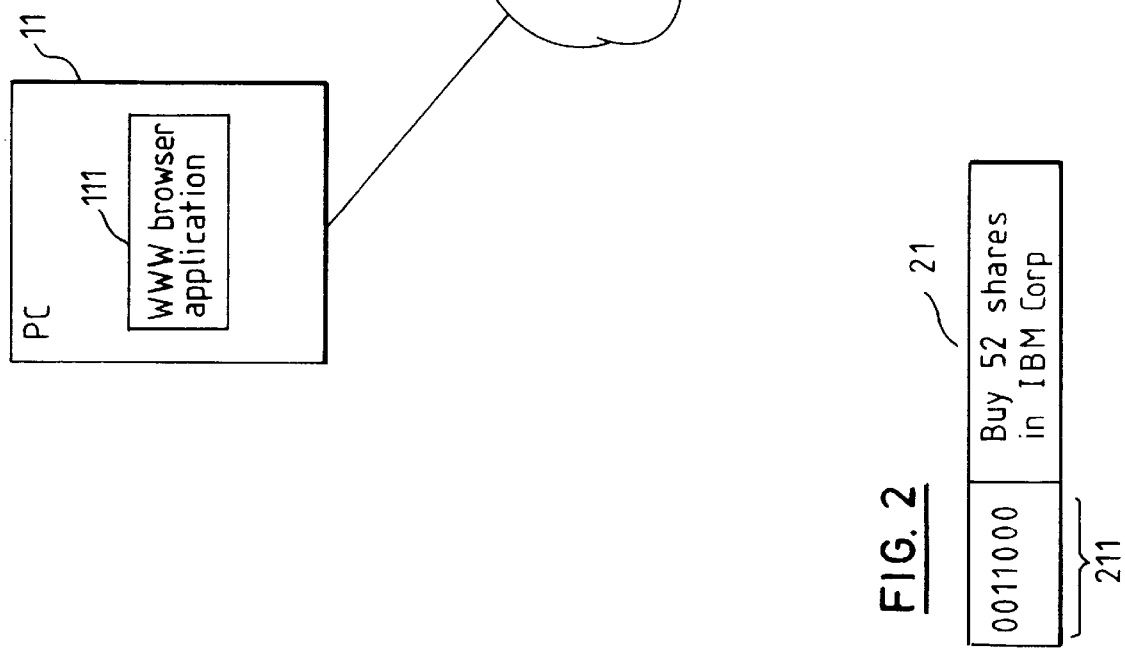
FIG. 2 shows a format of a message with a flag indicating that logging should take place, according to a preferred embodiment of the present invention.

The customer using the PC 11 may experience that certain of his buy/sell requests are resulting in an error somewhere downstream in the chain of computers described above. For example, when the customer tries to purchase more than 50 shares in the IBM Corp., the customer does not receive a reply confirming that the purchase has completed. In accordance with a preferred embodiment of the present invention, as shown in FIG. 2, the customer sets a flag 211 of a predetermined bit value (e.g., 0011000) in the message 21 (requesting to purchase 52 shares in the IBM Corp.) before the message is sent over the network 15 to the WWW server application 121. The customer knows from previous experience that whenever he tries to buy more than 50 shares in the IBM Corp., he will not get a reply, and the customer would like to know the reason for this (i.e., where the error is occurring). Thus, the customer (via the customer's application) sets the flag 211 to the predetermined value 0011000 before sending out the purchase request.

When the WWW server application 121 receives the purchase request over the network 15, the midrange computer 12 notices that the flag 211 is set to the predetermined bit pattern value 0011000. In response to this, the WWW server application 121 reports the arrival of the message 21 as an event to the central trace facility application 141 by sending a message over the network 15 to the midrange computer 14. The central trace logging facility 141 then stores the event into its trace log in system memory.

Then, the WWW server application 121 carries on as usual (as described above) by sending the purchase request over the network 15 to the transaction processing application 131 on the mainframe computer 13. Application 131 then notices that the flag 211 is set to the predetermined bit pattern value 0011000. In response to this, the transaction processing application 131 reports the arrival of the message 21 as an event to the central trace facility application 141 by sending a message over the network 15 to the midrange computer 14. The central trace logging facility 141 then stores the event into its trace log in system memory. Of course, the format and/or content of the flag could be different between applications 121 and 131 (as compared to its format and/or content between applications 111 and 121).

Accordingly, by querying the central trace logging facility 141 the customer using the WWW browser application 111 can determine that the request has arrived at the WWW server application 121 (since the event of the application 121 receiving the flagged request has been logged). From this, the customer can deduce that the error has not occurred in the network connection between the PC 11 and the midrange computer 12. Likewise, by querying the central trace logging facility 141 the customer can determine that the request has arrived at the transaction processing application 131 (since the event of the application 131 receiving the flagged request has been logged). From this, the customer can deduce that the error has not occurred in the network connection between the midrange computer 12 and the mainframe computer 13.

In another embodiment, in order to provide a more complete picture of what has happened during the message flow, a receiving application (such as WWW server application 121) reports not only the arrival of a message with the flag set but also reports to the central trace logging facility 141 as an event the exit of the message as the message leaves the WWW server application 121 on its way to the transaction processing application 131. While this has the disadvantage of filling up the log with more trace data, this embodiment has the advantage over the first embodiment of providing more information to the party querying the trace log. For example, if a flagged request does not arrive at transaction processing application 131, the trace log can be queried to determine whether the flagged request has exited from application 121. If it has so exited, then the customer querying the trace table can deduce that an error has occurred in the network connection between the midrange computer 12 and the mainframe computer 13. If it has not so exited, then the customer querying the trace table can deduce that an error has occurred within the application 121.

Figure 3:
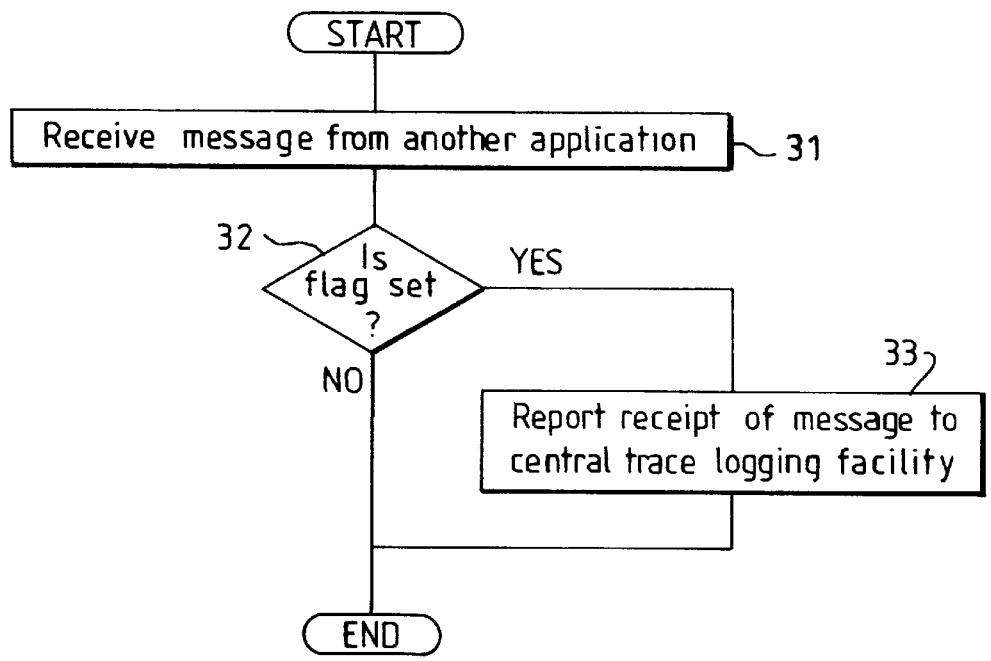
FIG. 3 is a flowchart showing the operational steps carried out by a receiving application, according to a preferred embodiment of the present invention.

The operational steps carried out by a receiving application (e.g., WWW server application 121) will now be discussed with reference to the flowchart of FIG. 3. At step 31, the receiving application 121 receives a message from another application (e.g., application 111) over network 15. At step 32, the receiving application 121 determines whether there is a flag in the received message that is set to the predetermined value, and if the flag is so set, the receiving application 121 reports (step 33) the receipt of the message to the central trace logging facility 141 over network 15.

The operational steps carried out by a sending application (e.g., WWW browser application 111) will now be discussed with reference to the flowchart of FIG. 4. At step 41, the sending application 111 determines whether the receipt of a message that it is planning on sending to a receiving application 121 should be logged in the central trace facility 141. In other words, the sending application is planning on sending a message to a receiving application and the sending application makes a determination as to whether the receiving application should be told to report the receipt of the message to the central trace logging facility, once the receiving application receives the message. If the answer is YES at step 41, then a flag of a predetermined bit value is added to the message at step 42 and then the message is sent to the receiving application at step 43. On the other hand, if the answer is NO at step 41, then the message is simply sent to the receiving application at step 43 (and step 42 is bypassed).

As discussed above, the sending application 111 might determine that the receipt of a message should be logged because from past experience with this type of message, the sending application 111 has experienced problems. Alternatively, the sending application could simply wish to carry out a test with a particular message, where the sending application will later query the central trace logging facility 141 to study the trace log for this message. A great advantage is attained here because of the dynamic nature by which the sending application can decide for which messages should the receipt thereof be logged when received by the receiving application.

Figure 4:
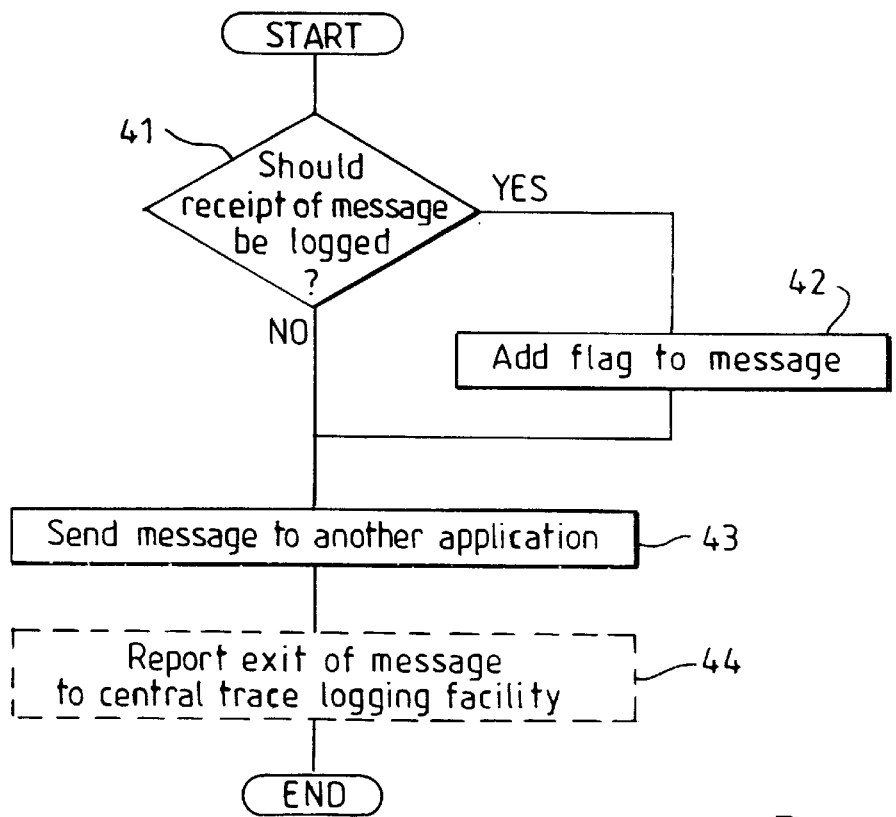
FIG. 4 is a flowchart showing the operational steps carried out by a sending application, according to a preferred embodiment of the present invention.

Further, in order to cover the alternative embodiments discussed above, if the sending application (e.g., 121, this time) has received a message from another application (e.g., 111) and the receiving application for this sending application 121 is the next application in the chain (application 131), the flowchart of FIG. 4 still applies for such an intermediary sending application 121, along with the addition of an optional step 44 (shown dotted). Specifically, the sending application 121 determines at step 41 that the receipt of the message by the receiving application 131 should be logged if the sending application 121 has in turn received the message with the flag set from another application 111. Step 42 then follows, where the sending application 121 adds the flag in the appropriate set position (if the format and contents of the flag are the same between all three applications then the format and contents for the flag between applications 121/131 is maintained from the way it was between applications 111/121). At step 43, the message is sent to the receiving application 131 and finally at step 44 the sending application 121 reports the exit of the message as an event to the central trace logging facility 141.

In the claims, the term "data processing apparatus" can be interpreted to mean a data processing machine (e.g., a computer) but there can be several such data processing apparatuses running on the same data processing machine. For example, each data processing apparatus could be a separate process on the same machine.

While the preferred embodiment has been described with respect to a plurality of applications in communication with each other via a network, the invention is also broad enough to cover a plurality of applications, all running on the same machine, in communication with each other, thus not requiring a network to inter-link machines.

I claim:

1. In a data processing system wherein a plurality of data processing applications are in communication with each other, a first data processing apparatus running a first data processing application, the apparatus comprising:

means for determining, on a dynamic real-time basis, during a communications session between the applications, for each message to be sent to a second data processing application running a second data processing application as part of said communications session, whether an indication of the receipt of the message by the second data processing application should be logged into a central logging trace facility, which is used to assist in locating errors which may have occurred during said communications session;

means for providing a predetermined indication in said message when the means for determining has dynamically determined that the message should be logged into the central facility; and means for sending said message to the second data processing apparatus.

2. The apparatus of claim 1 wherein the means for determining determines that a message to be sent to a second data processing apparatus running a second data processing application should be logged into a central facility when the first apparatus has received a message with the predetermined indication.

3. The apparatus of claim 2 wherein the apparatus further comprises means for reporting to the central facility the exit of the message from the first data processing application.

4. The apparatus of claim 1 wherein the predetermined indication is a bit pattern value forming a flag.

5. The apparatus of claim 1 wherein the plurality of applications are in communication with each other via a network.

6. The apparatus of claim 5 wherein the network is the Internet.

7. The apparatus of claim 5 wherein one of the plurality of applications is a World Wide Web based application.

8. In a data processing system wherein a plurality of data processing applications are in communication with each other, a method of operating a first data processing apparatus running a first data processing application, the method comprising steps of:

determining, on a dynamic real-time basis, during a communications session between the applications, for each message to be sent to a second data processing application running a second data processing application as part of said communications session, whether an indication of the receipt of the message by the second data processing application should be logged into a central logging trace facility, which is used to assist in locating errors which may have occurred during said communications session;

providing a predetermined indication in said message when the determining step has dynamically determined that the message should be logged into the central facility; and sending said message to the second data processing apparatus.

9. The method of claim 8 wherein the step of determining determines that a message to be sent to a second data processing apparatus running a second data processing application should be logged into a central facility when the first apparatus has received a message with the predetermined indication.

10. The method of claim 9 wherein the method further comprises a step of reporting to the central facility the exit of the message from the first data processing application.

11. The method of claim 8 wherein the predetermined indication is a bit pattern value forming a flag.

12. The method of claim 8 wherein the plurality of applications are in communication with each other via a network.

13. The method of claim 12 wherein the network is the Internet.

14. The method of claim 13 wherein one of the plurality of applications is a world wide web based application.

15. A computer program product stored on a computer readable storage medium tangibly embodying a program of instructions executable by a computer to perform the method steps of claim 8.

* * * * *